United States Patent
Hall et al.

(10) Patent No.: US 7,354,262 B2
(45) Date of Patent: *Apr. 8, 2008

(54) STRAIN MATCHED THREADS FOR A HIGH PRESSURE HIGH TEMPERATURE PRESS APPARATUS

(76) Inventors: David R. Hall, 2185 S. Larsen Pkwy., Provo, UT (US) 84606; Scott Dahlgren, 2185 S. Larsen Pkwy., Provo, UT (US) 84606; Timothy C. Duke, 2185 S. Larsen Pkwy., Provo, UT (US) 84606; Joe Fox, 2185 S. Larsen Pkwy., Provo, UT (US) 84606

( * ) Notice: Subject to any disclaimer, the term of this patent is extended or adjusted under 35 U.S.C. 154(b) by 6 days.

This patent is subject to a terminal disclaimer.

(21) Appl. No.: 11/668,361

(22) Filed: Jan. 29, 2007

(65) Prior Publication Data

US 2007/0122512 A1 May 31, 2007

Related U.S. Application Data

(63) Continuation-in-part of application No. 11/175,238, filed on Jul. 6, 2005, now Pat. No. 7,186,104.

(51) Int. Cl.
*B29C 43/04* (2006.01)
*B29C 43/32* (2006.01)

(52) U.S. Cl. .................. 425/77; 425/193; 425/330; 425/DIG. 26

(58) Field of Classification Search ............... 425/77, 425/193, 330, DIG. 26
See application file for complete search history.

(56) References Cited

U.S. PATENT DOCUMENTS

| | | | | |
|---|---|---|---|---|
| 2,968,837 A * | 1/1961 | Zeitlin et al. | ............... | 425/77 |
| 3,257,688 A * | 6/1966 | Levey, Jr. | ............... | 425/77 |
| 4,842,464 A * | 6/1989 | Green | ............... | 411/307 |
| 6,186,763 B1 * | 2/2001 | Scanlan | ............... | 425/195 |
| 6,336,802 B1 * | 1/2002 | Hall | ............... | 425/77 |
| 7,186,104 B2 * | 3/2007 | Hall et al. | ............... | 425/77 |
| 2007/0209186 A1 * | 9/2007 | Hall et al. | ............... | 29/428 |

* cited by examiner

*Primary Examiner*—Robert B. Davis
*Assistant Examiner*—Joseph Leyson
(74) *Attorney, Agent, or Firm*—Tyson J. Wilde

(57) ABSTRACT

The present invention includes a hydraulic cartridge and unitary frame connection for a high pressure high temperature press apparatus with the hydraulic cartridge having a cylindrical base and truncated hollow conical section The truncated section has an external threadform with a taper between about 2.650 and 5.650 inches per foot. The unitary frame having an opening with an internal threadform extending axially substantially between an outer surface and an inner reaction chamber defined by the unitary frame and the internal threadform being threadedly mated with the external threadform of the hydraulic cartridge such that a load is substantially equally distributed across the external threadform.

20 Claims, 18 Drawing Sheets

STRAIN MATCHED THREADS FOR A HIGH PRESSURE HIGH TEMPERATURE PRESS APPARATUS

CROSS REFERENCE TO RELATED APPLICATIONS

This application is a continuation-in-part of a U.S. patent application Ser. No. 11/175,238, now U.S. Pat. No. 7,186,104, which was filed on Jul. 6, 2005 and entitled Strain Matched Threads for a High Pressure High Temperature Press Apparatus. U.S. patent application Ser. No. 11/175,238, which is herein incorporated by reference for all that it discloses, is currently pending before the U.S. Patent Office.

BACKGROUND OF THE INVENTION

The invention relates to high pressure high temperature (HPHT) press apparatuses. For example, such presses are useful in the superhard materials production industry. Some examples of superhard materials high pressure high temperature presses produce and sinter include cemented ceramics, diamond, polycrystalline diamond, and cubic boron nitride. HPHT press apparatuses require significant structural mass to withstand the ultra high pressures essential to synthetically form superhard materials. Uneven strain distribution across the threaded interface of press components, such as a hydraulic cartridge and unitary frame, cause increased cyclical fatigue promoting early failure in the cartridges and/or frame. Various press designs are known in the art of superhard materials production and have employed assorted concepts to contain the immense reaction forces that are required to process superhard materials. For example, U.S. Pat. Nos. 2,918,699 and 3,913,280 disclose a tie-bar frame press design. The tie bar press relies on press mass largely to prevent press rupture during press cycle in which bending moments of the tie bars become great. Other versions employ a polyhedral frame of six crossheads to prevent press rupture during the cycle such as disclosed in U.S. Pat. No. 2,968,837.

The presses are often classified by the tonnage of pressure they are capable of exerting on a reaction cell, the container which is inserted into the press reaction chamber that houses the sintering raw material for transformation under high pressures and temperatures into superhard materials. For example, a 3000-ton multi-axis press typically is capable of producing approximately 700,000 p.s.i. on each face of a cubic reaction cell. During the press cycle, the reaction cell is usually subject to ultra high compressive forces and temperatures; the pressure inside the cell must reach 35 kilobars or more to produce superhard materials such as polycrystalline diamond. Simultaneously, an electrical current is passed through the cell's resistance heating mechanism raising the temperature inside the cell to above 1000° C. After the reaction cell is subject to high pressures and temperatures for a set period of time, it is quickly cooled. Pressure is then released on each side of the cell and the cell is removed from the internal reaction chamber.

The amount of compressive forces a high pressure high temperature press can exert on a given reaction cell and consequently the maximum reaction cell size and payload, are limited by the reaction forces the press can endure without catastrophic rupture. Most often, the size and mass of the press determines its threshold capabilities for tonnage before catastrophic rupture occurs. For example, the weight of a tie-bar press with a tonnage rating of 3000 may exceed 60 tons. The weight of a 4000-ton tie bar press may exceed 100 tons. Moreover, large tonnage press types as described above are often expensive to construct and its efficiency is typically proportional to the duration of its cycle and volume of its payload. Therefore, in general, the smaller the press mass and the shorter the duration of the pressing cycle, and the larger the reaction cell is with concomitant enlarged payload volume, then the higher the economy and efficiency of the multi-axis press. Essentially, the greater reaction forces a press design can withstand at a given mass in conjunction with decreased energy consumption per cycle and increased reaction cell payload, then the manufacture of superhard materials becomes more viable.

BRIEF SUMMARY OF THE INVENTION

The present invention includes a hydraulic cartridge and unitary frame connection for a high pressure high temperature press apparatus with the hydraulic cartridge having a cylindrical base and truncated hollow conical section. The truncated section has an external threadform with a taper between about 2.650 and 5.650 inches per foot. The unitary frame having an opening with an internal threadform extending axially substantially between an outer surface and an inner reaction chamber defined by the unitary frame and the internal threadform being threadedly mated with the external threadform of the hydraulic cartridge such that a load is substantially equally distributed across the external threadform.

The unitary frame may have an inner reaction chamber and having three pairs of coaxial openings that taper towards the inner reaction chamber. Each coaxial opening may have an internal threadform extending axially substantially between an outer surface of the unitary frame and the inner reaction chamber. Six hydraulic cartridges having a substantially cylindrical base and a truncated hollow conical section are threaded into the coaxial threaded openings at the truncated conical section The truncated conical section includes external threadforms with a taper no greater than 5.650 inches per foot extending radially inward from a first cartridge thread of the internal threadform adjacent the cylindrical base to a last cartridge thread of the internal threadform adjacent a working end of the truncated hollow conical section. The taper is between about 2.650 and 5.650 inches per foot. The internal threadform is adapted to threadingly mate with the external thread form.

BRIEF DESCRIPTION OF THE DRAWINGS

The foregoing and other features of the present invention will become more fully apparent from the following description, taken in conjunction with the accompanying drawings. The invention will be described with additional specificity and detail through use of the accompanying drawings with the understanding that these drawings depict only typical embodiments in accordance with the invention and are therefore not to be considered limiting in scope.

DETAILED DESCRIPTION OF THE INVENTION AND THE PREFERRED EMBODIMENT

It will be readily understood that the components of the present invention, as generally described and illustrated in the Figures herein, may be arranged and designed in a variety of different configurations. Thus, the following detailed description of embodiments of the present invention, as represented in the Figures, is not intended to limit the scope of the invention, but is merely representative of various selected embodiments of the invention. The embodiments of the invention will be best understood by reference to the drawings wherein like parts are designated by like numerals throughout. Similar features are shown and referred to in each drawing by number, though not necessarily always described under the Figure heading below.

Figure 1:
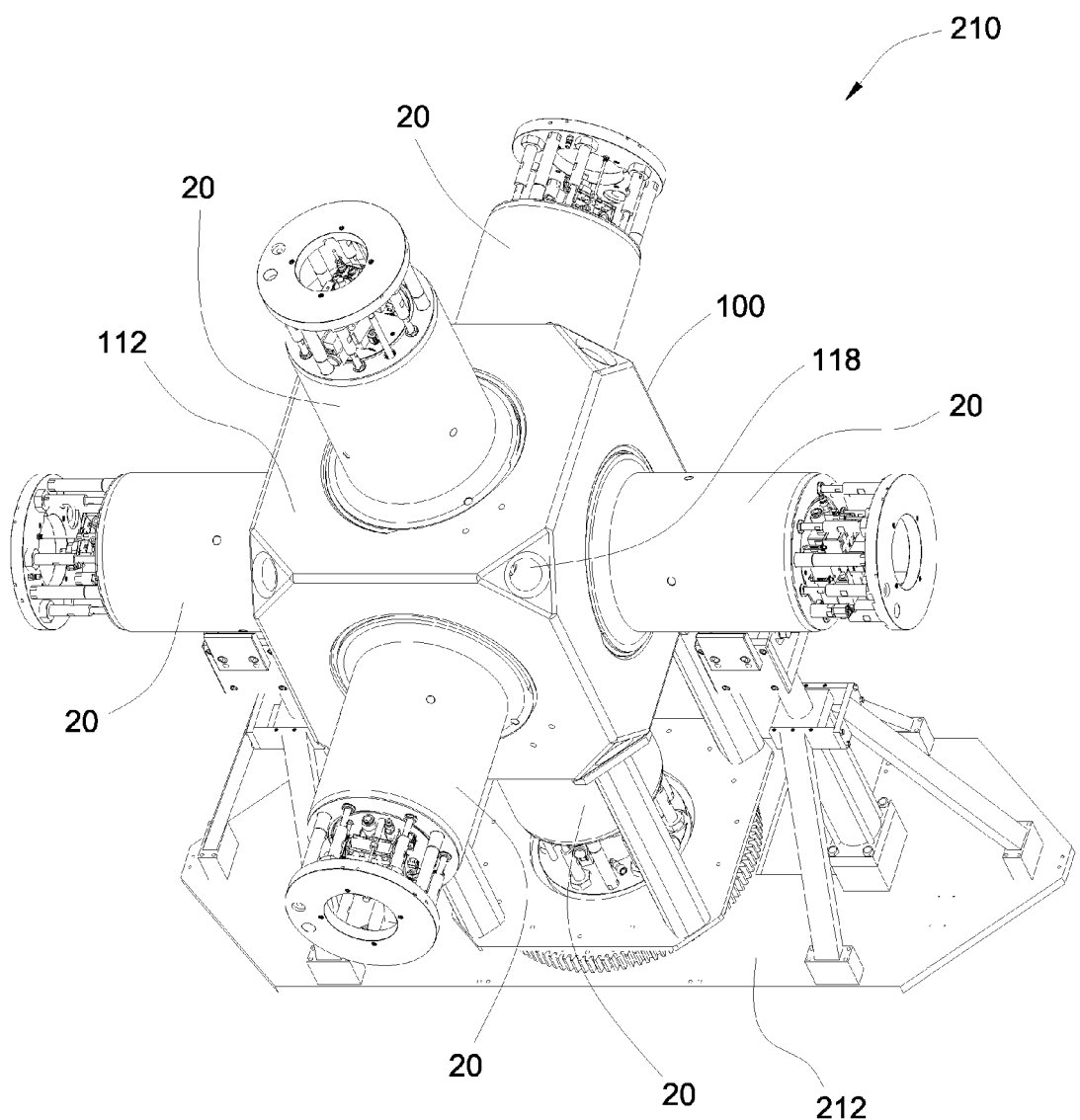
FIG. 1 is a perspective diagram of a high pressure high temperature press apparatus including a unitary frame and six hydraulic cartridges, a preferred embodiment of the invention.

Referring to the drawings, a perspective diagram of a high pressure high temperature press apparatus 210 is shown in FIG. 1. In a preferred embodiment the high pressure high temperature press apparatus 210 includes a unitary frame 100 and six hydraulic cartridges 20. The high pressure high temperature press apparatus rests on a support base 212 which accommodates ease of repair and assembly of the press. The unitary frame 100 has an outer surface 112 and secondary boreholes 118 between the outer surface 112 and inner reaction chamber, which is not shown in this Figure.

Figure 2:
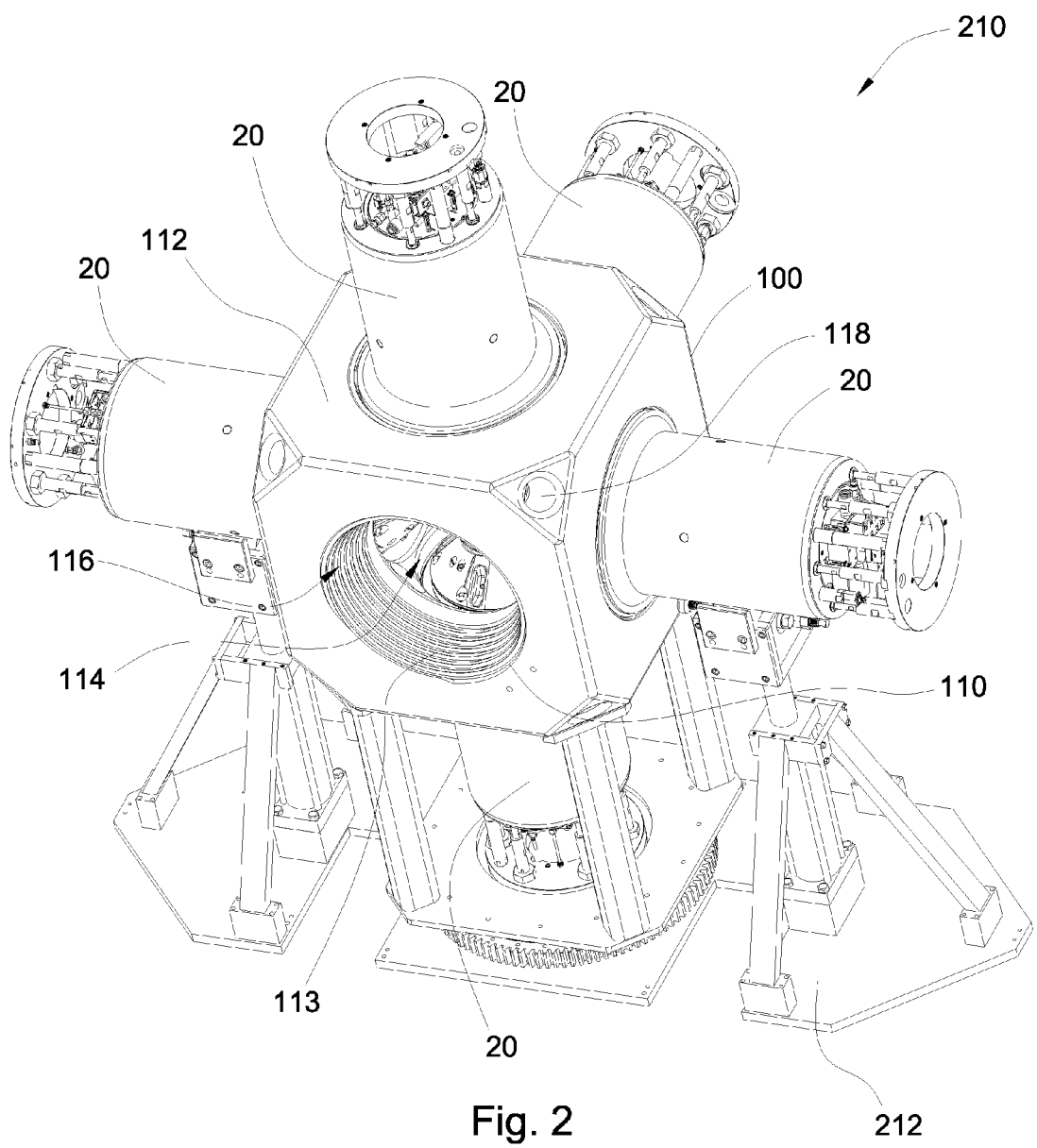
FIG. 2 is a perspective diagram of the same press apparatus as in FIG. 1 with a hydraulic cartridge removed.

FIG. 2 is a perspective diagram the same high pressure high temperature press apparatus 210 as in FIG. 1 with a hydraulic cartridge 20 removed. The unitary frame 100 defines an inner reaction chamber 114. A substantially coaxial opening 110 has an internal threadform 113 that may extend axially substantially between the outer surface 112 and inner reaction chamber 114. The internal threadform 113 comprises a taper 116 sloping towards the inner reaction chamber 114. At least one secondary borehole 118 is between the inner chamber 114 and outer surface area 112. The internal threadform 113 is adapted to mate with the hydraulic cartridge 20.

Figure 3:
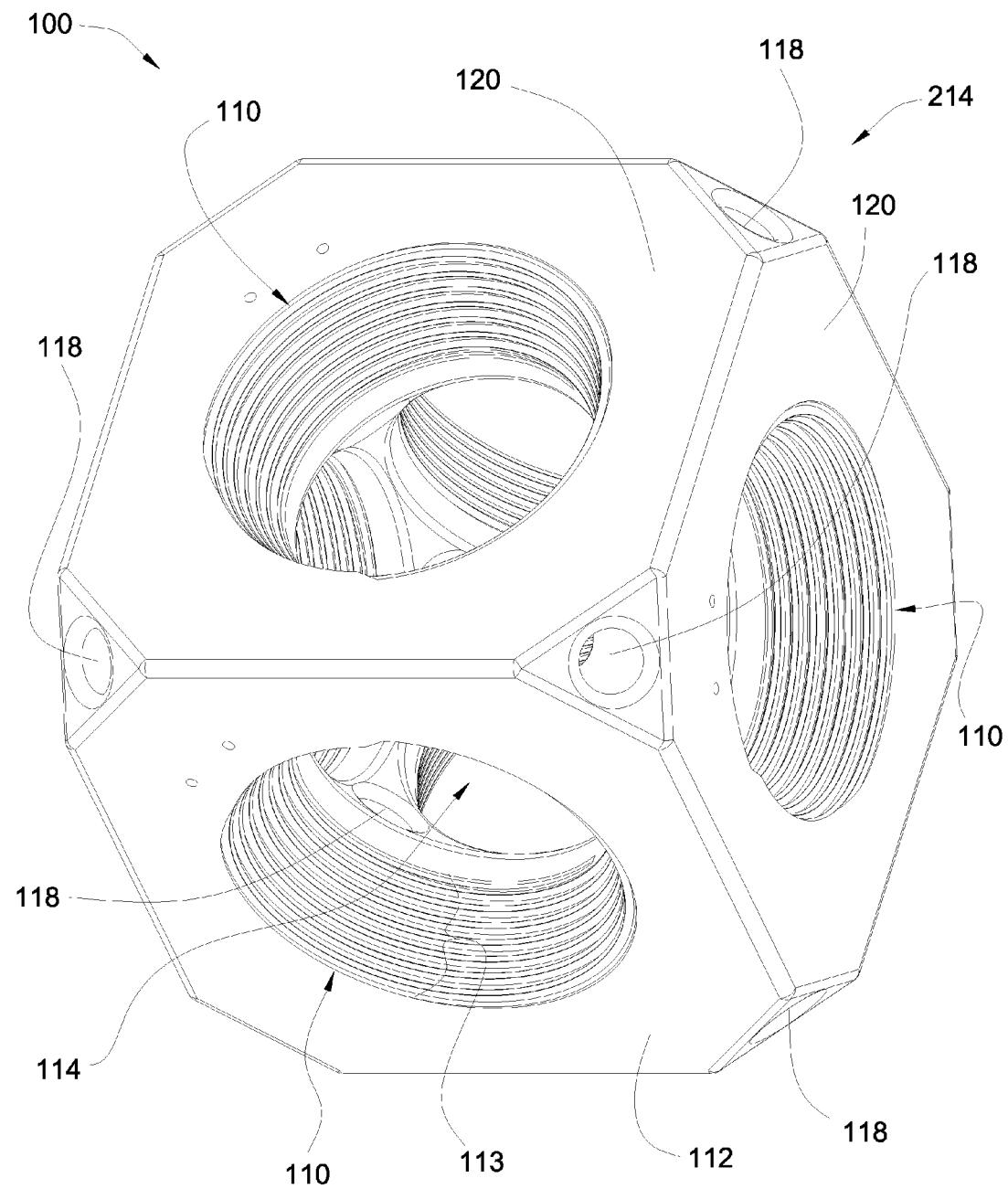
FIG. 3 is a perspective diagram of an embodiment of a cubic shaped unitary frame.

Turning now to FIGS. 3-6 which depict various embodiments of the present invention, a preferred embodiment includes a unitary frame 100 that is a substantially cubic shape 214 as seen in FIG. 3. A plurality of faces 120 comprises the outer surface 112 of the unitary frame 100 comprising a substantially cubic shape 214. Three substantially coaxial openings 110 having the internal threadforms 113 extend axially substantially between an outer surface 112 and an inner reaction chamber 114. The internal threadforms 113 are adapted to mate with the hydraulic cartridge 20 and the cartridge 20 is attached to the frame 100 along the length of the threadforms 113. At least one secondary borehole 118 is in the cubic unitary frame 100 between the outer surface 112 and inner chamber 114. In a preferred embodiment, the unitary frame 100 that is a substantially cubic shape 214 and has eight secondary boreholes. The secondary boreholes are useful for access to the inner reaction chamber when all six hydraulic cartridges are connected to the unitary frame 100 in the coaxial openings 110.

Figure 4:
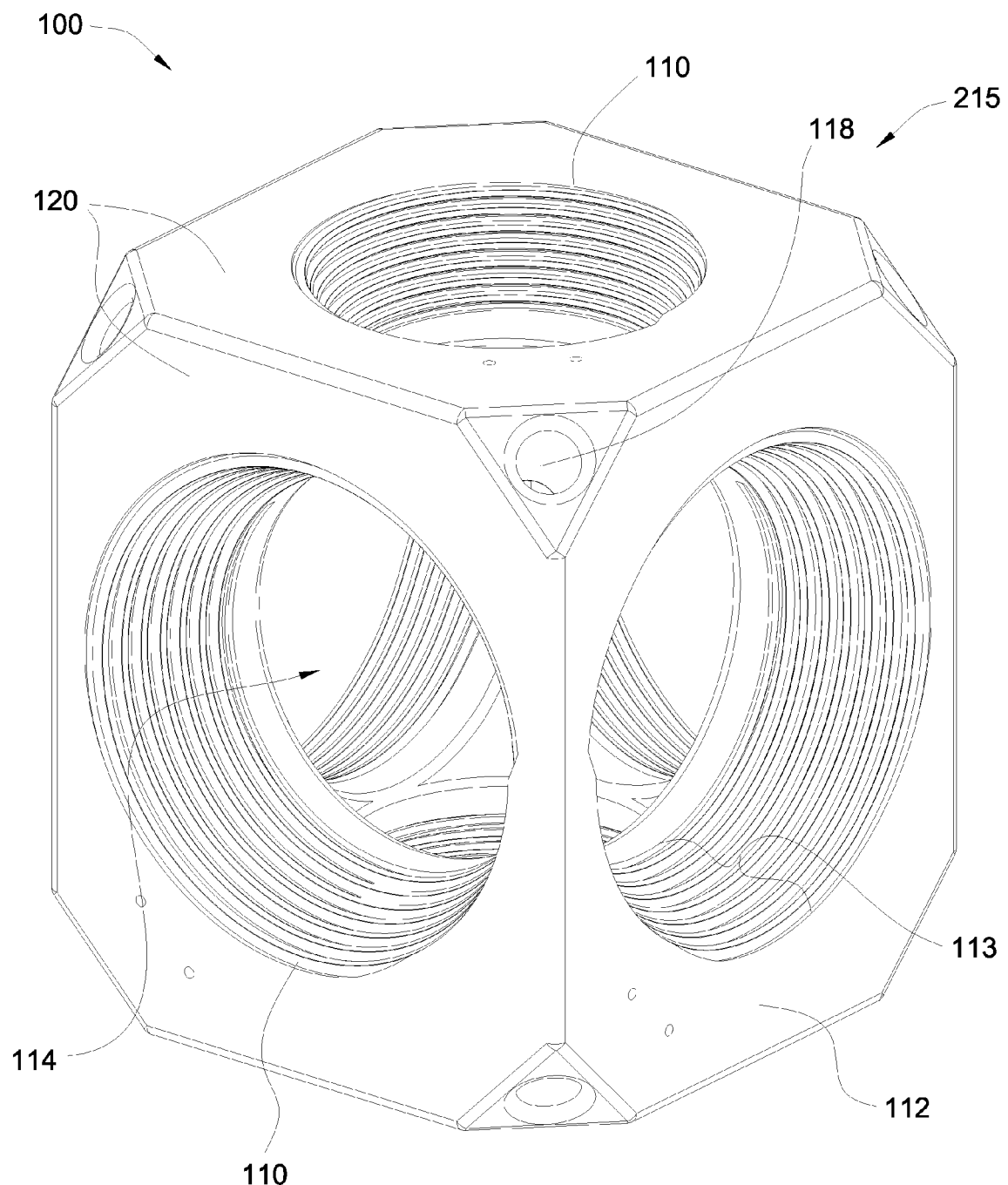
FIG. 4 is a perspective diagram of an embodiment of rectangular shaped unitary frame.
Figure 5:
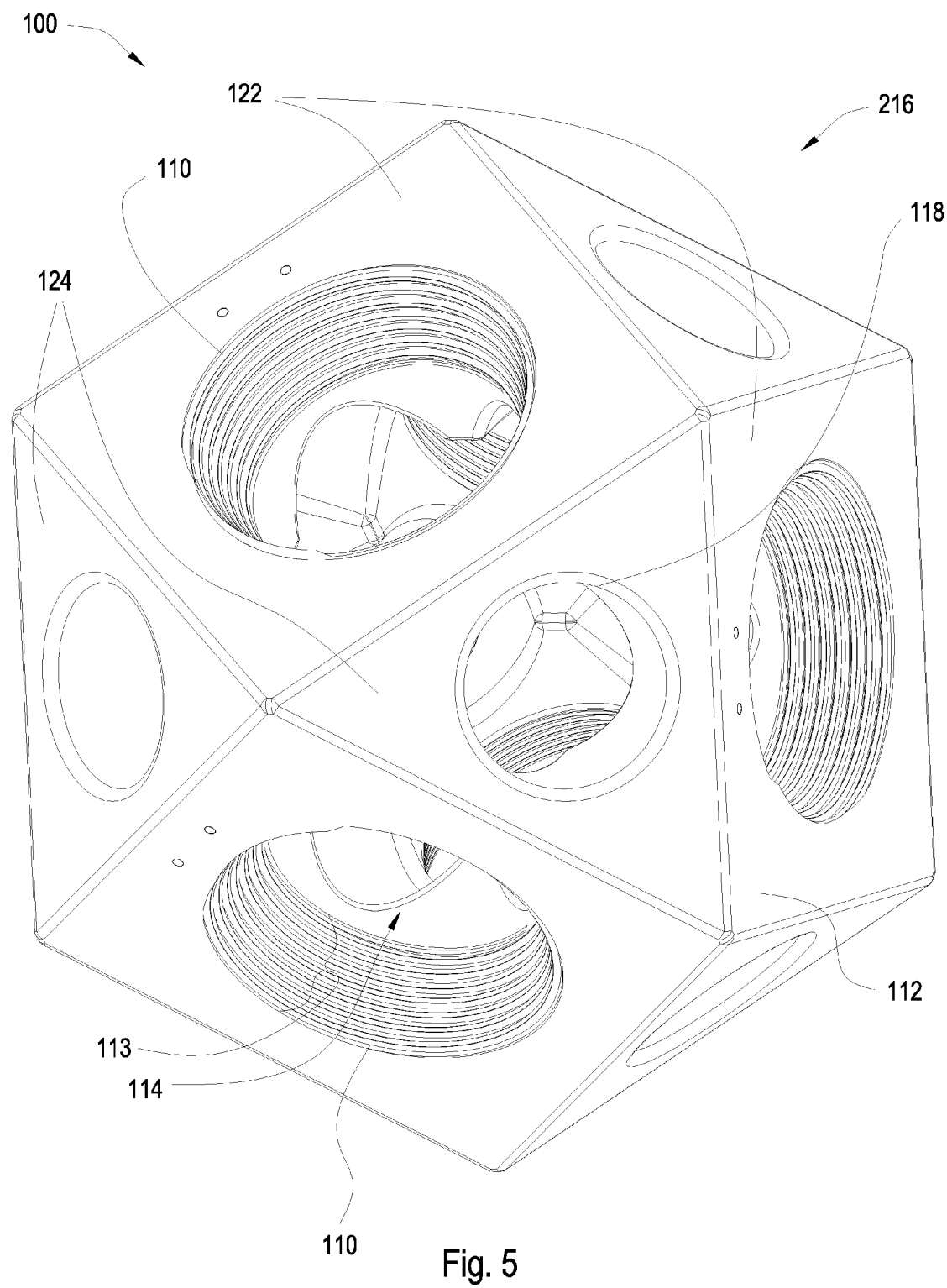
FIG. 5 is a perspective diagram of an embodiment of truncated cubic shaped unitary frame.
Figure 6:
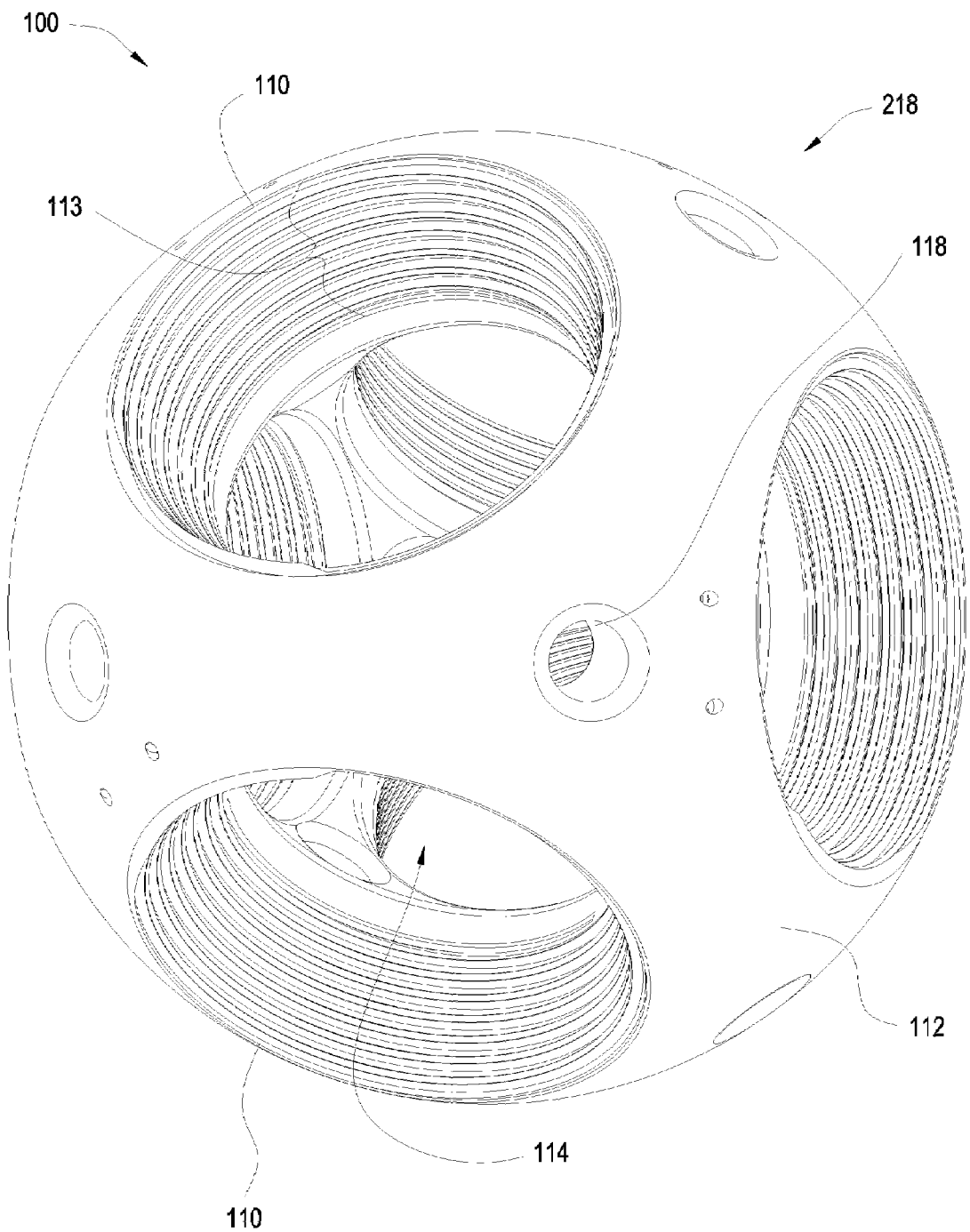
FIG. 6 is a perspective diagram of an embodiment of spherical shaped unitary frame.

FIG. 4 shows a unitary frame 100 that is a substantially rectangular shape 215. The other features of the unitary frame as previously described are also shown in FIGS. 4, 5 and 6. A unique feature of this embodiment is the ability to have different sized hydraulic cartridges which may use different pressure intensities in order to place the same pressure on the faces of a non-equilateral polyhedron reaction cell, such as a prismatic or rectangular reaction cell, within the inner reaction chamber 114. This may be beneficial for a non-cubic shaped reaction cell to help balance the pressures on the different sized faces of the reaction cell. FIG. 5 depicts a unitary frame 100 that is a substantially truncated cubic shape 216 including substantially coaxial openings 110. The secondary boreholes 118 are much larger in this embodiment and thus truncate the square faces 122 giving the truncated cubic unitary frame 216 fourteen sides in all: six square faces 122 with coaxial openings and eight triangular faces 124 with secondary boreholes 118. FIG. 6 depicts a unitary frame 100 that is a substantially spherical shape 218, another embodiment of the invention It is believed, that the spherical shape of the unitary frame imbues it with the equivalent strength of other frames but with less mass. The secondary holes 118 are between the outer surface 112 and inner reaction chamber 114 of the spherical shaped 218 unitary frame 100. Hydraulic cartridges are connected to the unitary frame in the three pairs of substantially coaxial openings 110.

Figure 7:
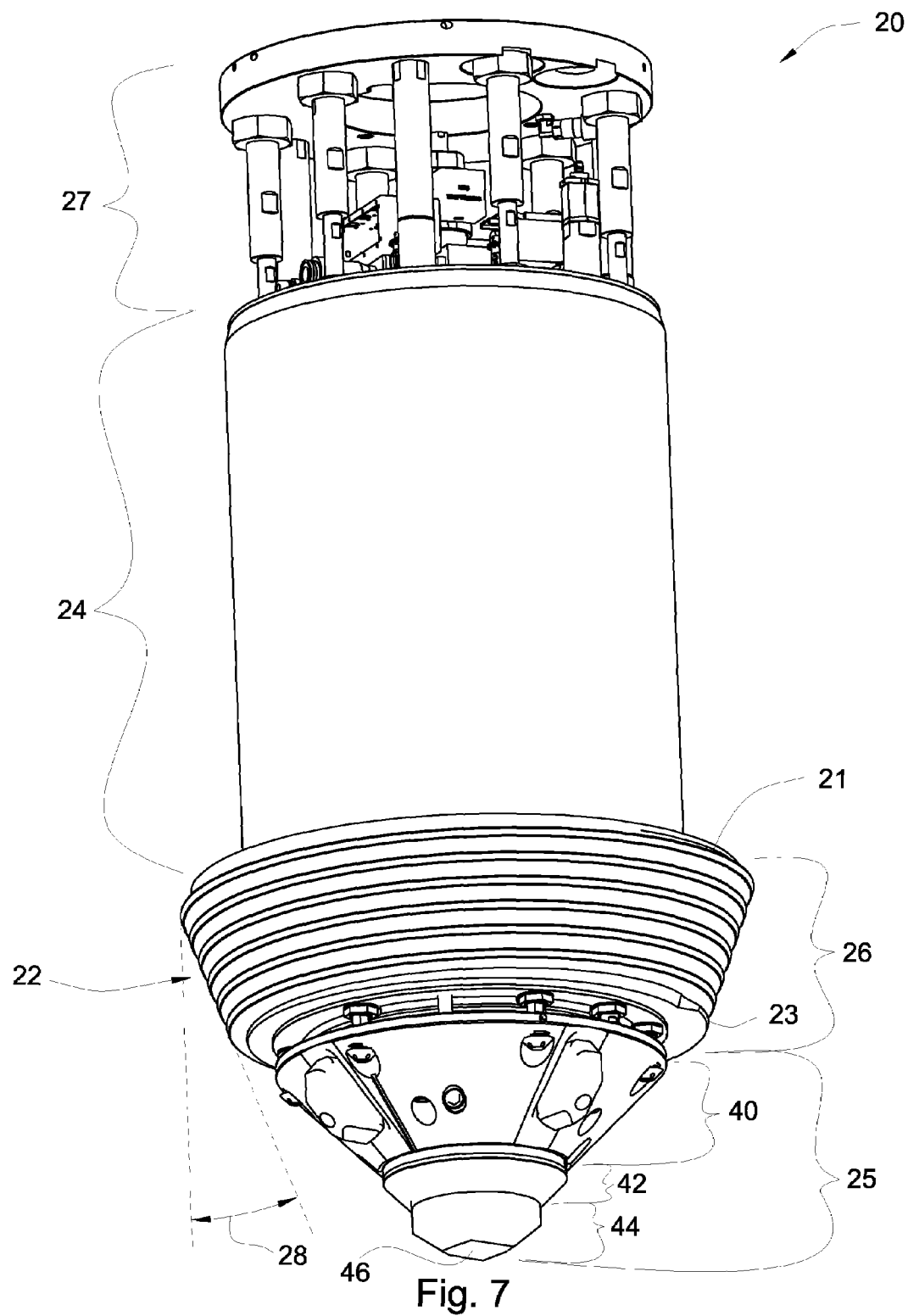
FIG. 7 is a perspective diagram of an embodiment of free standing hydraulic cartridge including a working end.

FIG. 7 shows a free standing hydraulic cartridge 20 including a working end 25 and hydraulic end 27. The hydraulic cartridge comprises a truncated hollow conical section 22 and a substantially cylindrical base 24. External threadform 26 has a taper 28 extending radially inward from a first cartridge thread 21 of the external threadform 26 adjacent the cylindrical base 24 to a last cartridge thread 23 of the external threadform 26 adjacent the working end 25 of the truncated conical section 22. The working end has three primary constituents, a key ring 40, a binding ring 42, and an anvil 44. The anvil face 46 compresses against a reaction cell face during the press cycle elevating the internal pressure of the reaction cell to a level conducive to sintering and producing superhard materials. The hollow portion of the conical section is not shown in this Figure but is discernible in later Figures.

Figure 8:
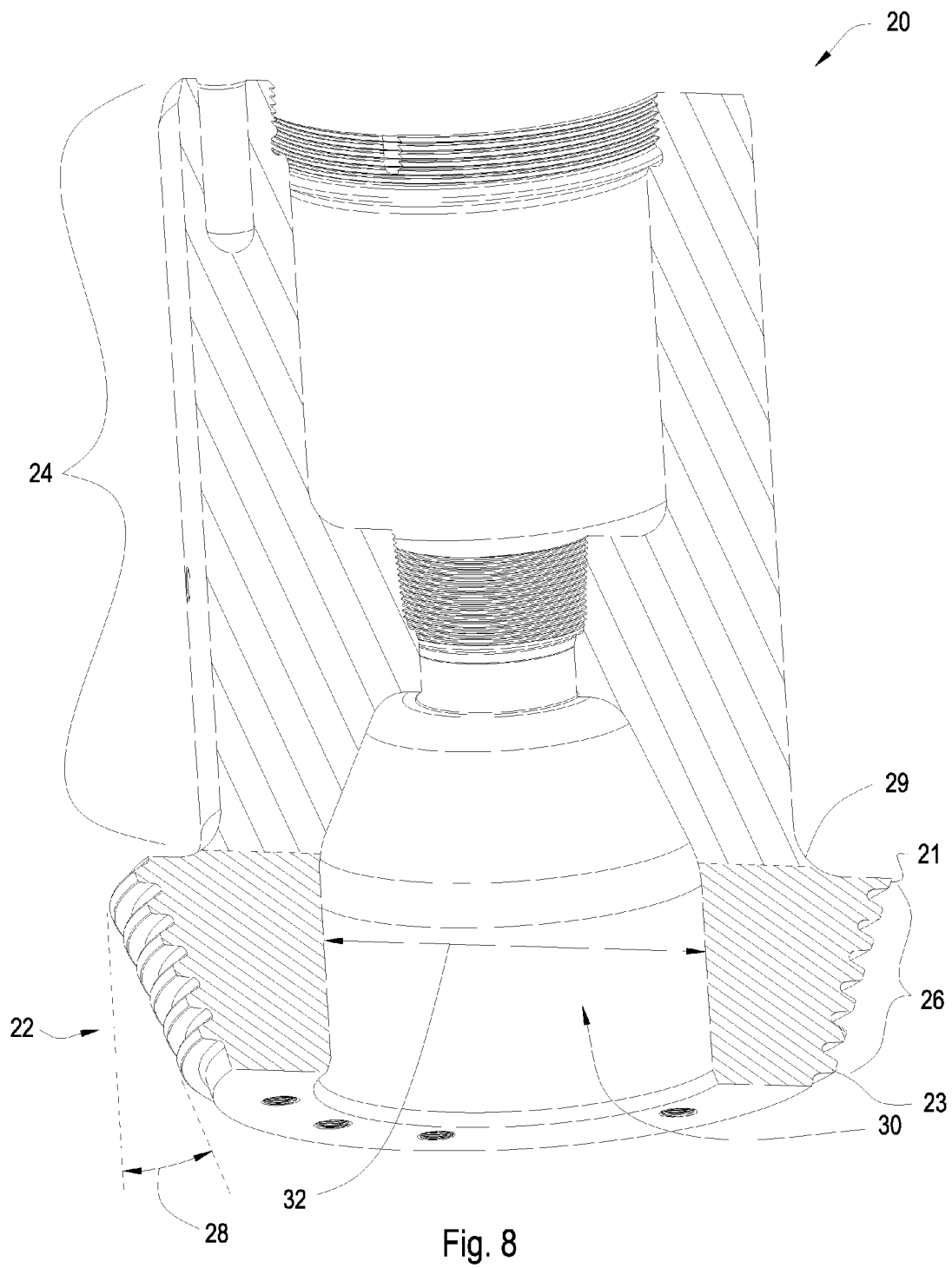
FIG. 8 is a cross-sectional diagram of an embodiment of a hydraulic cartridge without the working end or internal components.

FIG. 8 is a cross-sectional diagram of a hydraulic cartridge 20 in FIG. 6 without the working end 25, hydraulic end 27, or various internal components not described herein to more easily and clearly describe the present invention. A change in cross hatch signifies the transition in the hydraulic cartridge from the cylindrical base 24 to the truncated hollow conical section 22. The hollow area 30 of the truncated conical section 22 includes an inner diameter 32. External threadform 26 has a taper 28 extending radially from a first cartridge thread 21 adjacent the cylindrical base 24 to a last cartridge thread 23 adjacent the working end (not shown). The taper 28 is preferably between the range of about 2.650 and 5.650 inches per foot. Most preferably, the taper is about 4.368 inches per foot. The number of external threads in the threadform along the taper of the truncated conical section is preferably between five and nine with six being the most preferred number of threads. In the most preferred embodiment, the hydraulic cartridge 20 further includes a radius cut 29 between the cylindrical base 24 and truncated hollow section 22. The radius cut 29 is preferably between about 1.000 and 5.000 inches with about 2.000 inches the most preferable radius cut. The truncated conical section defines a cross-sectional conical area 42 between an inside diameter 32 of the truncated hollow conical section 22 and the external threads 26 with a taper 28.

Figure 9:
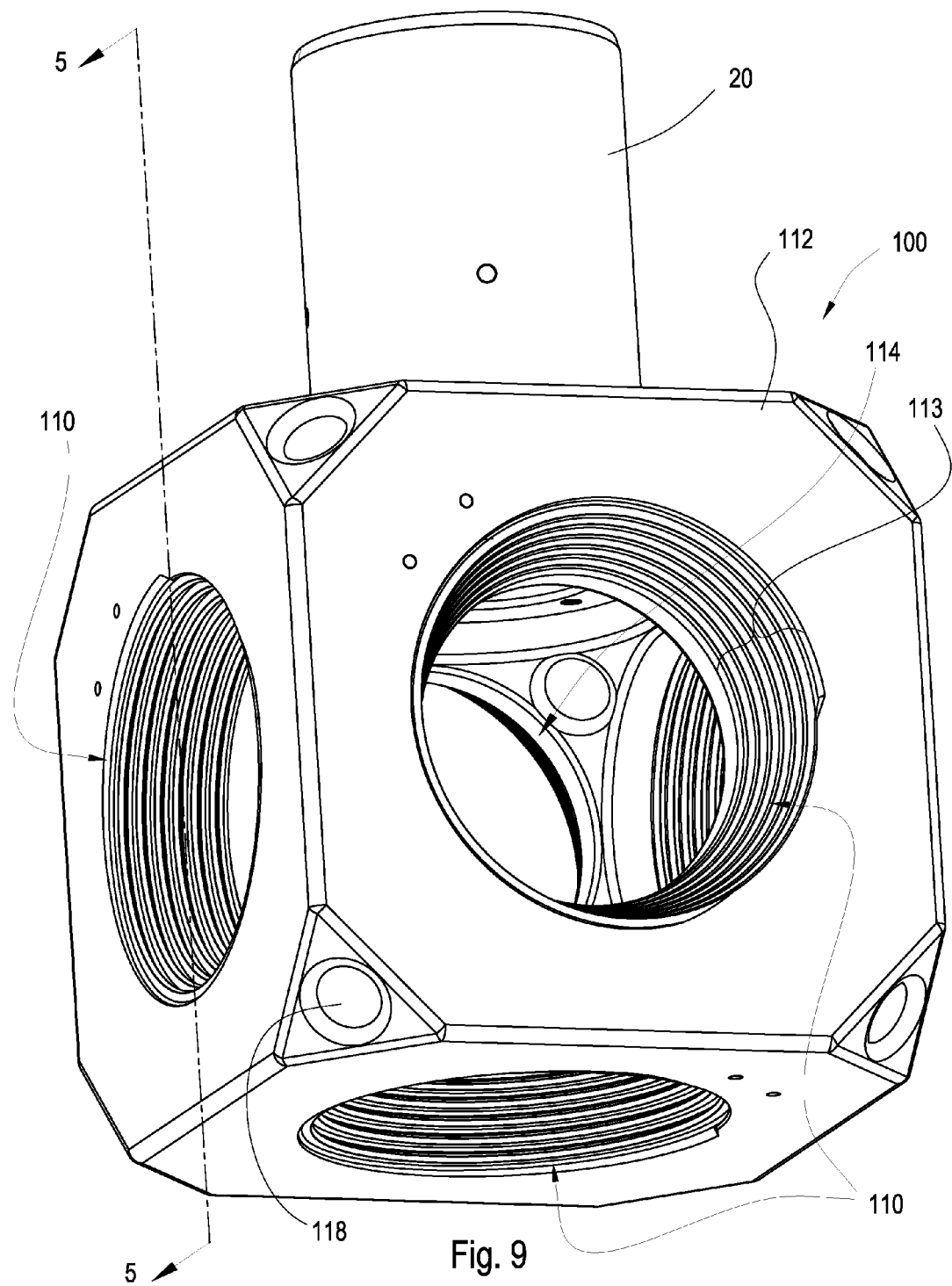
FIG. 9 is a perspective diagram of an embodiment of a unitary frame with only one hydraulic cartridge.
Figure 10:
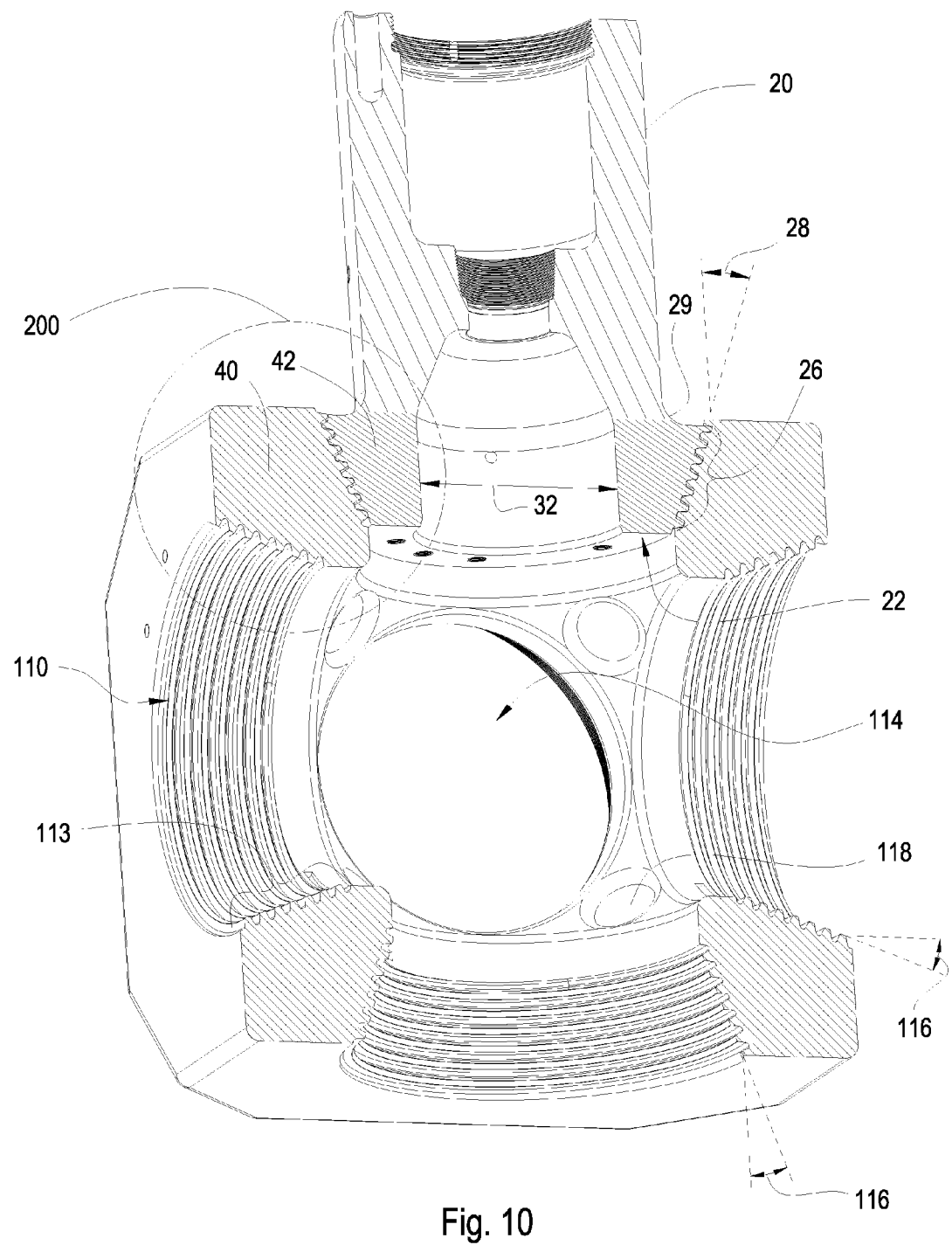
FIG. 10 is a cross-sectional diagram of an embodiment of a unitary frame with only one hydraulic cartridge along the lines 5-5 in FIG. 9.
Figure 11:
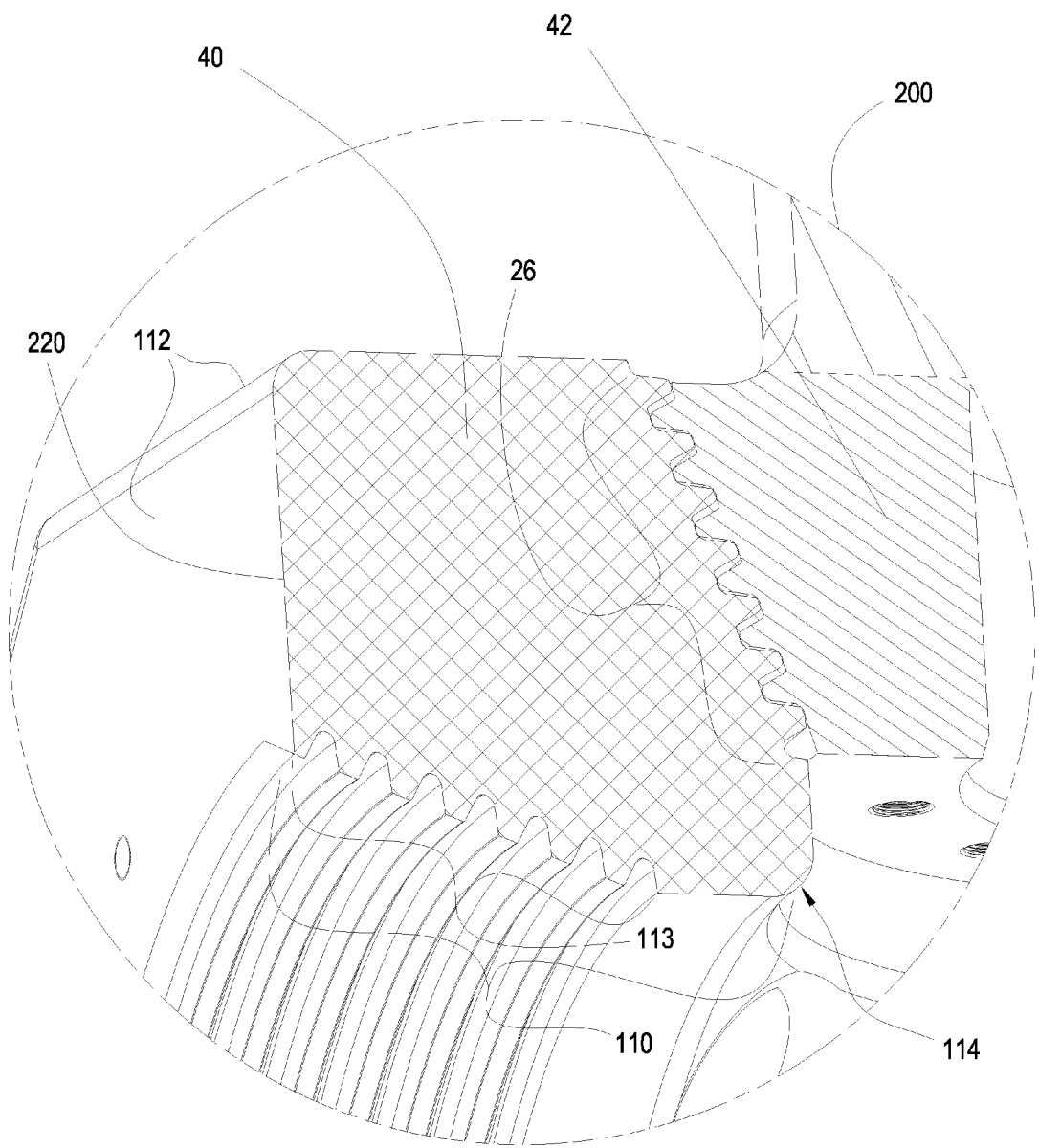
FIG. 11 is a detailed diagram of enlargement 200 in FIG. 10 including a cross-sectional wedge shaped area and a cross-sectional conical area.

Turning now to FIGS. 9-11, the threaded connection with strain matched threads between the unitary frame and hydraulic cartridges is more fully explained. FIG. 9 shows a perspective diagram of a unitary frame 100 with only one hydraulic cartridge 20 connected within the coaxial openings 110. The coaxial openings 110 have an internal threadform 113 that may extend axially substantially between the outer surface 112 and inner reaction chamber 114. The internal threadform 113 is adapted to mate with the hydraulic cartridge 20. Secondary boreholes 118 are between the outer surface 112 and inner reaction chamber 114 allowing access to the inner reaction chamber before, during, and after the press cycle. Line 5-5 along the unitary frame indicate a center plane orthogonal to a pair of substantially coaxial openings 110. The center plane is substantially equidistant between the pair of coaxial openings 110 and cuts through the center point of the unitary frame.

FIG. 10 is a cross-sectional diagram of the unitary frame with only one hydraulic cartridge along the lines 5-5 in FIG. 9. This shows one half of the press along the center plane orthogonal to a pair of coaxial openings. Again, the hydraulic end 27, working end 25, and internal components of the hydraulic cartridge 20 are not shown to more clearly describe and show the threaded connection between the unitary frame 100 and hydraulic cartridge 20. The internal threadform 113 is adapted to mate with the hydraulic cartridge 20. The internal and external threadforms 113, 26 are preferably substantially the same, but may vary as long as they mate with one another. The contours of the threadforms for will be shown and described in FIG. 13. The hydraulic cartridge 20 is attached to the unitary frame 100 along the length of the threadforms. The coaxial openings comprise a taper 116 which is shown in the drawing. This taper substantially matches the taper 28 of the hydraulic cartridge 20. The coaxially threaded opening taper is between the range of about 2.650 and 5.650 inches per foot and is preferably about 4.368 inches per foot. The unitary frame defines a cross-sectional wedge shaped area 40 along a center plane orthogonal to a pair of coaxial openings 110. Four equal cross-sectional wedge shaped areas are seen in the drawing.

The truncated conical section 22 defines a cross-sectional conical area 42 between the inside diameter 32 and external threadform 26. Two equal cross-sectional conical areas are shown in the drawing. If four hydraulic cartridges were shown in the picture within the coaxial openings cross sectioned, then eight total cross-sectional conical areas would be shown. When the threadforms are strain matched to withstand greater reaction forces during the press cycle, a desired ratio between a cross-sectional wedge shaped area and an adjacent cross-sectional conical area exists. The preferred ratio between a cross-sectional conical area and a cross-sectional wedge shaped area is at least about 30% i.e. one cross-sectional conical area is at least about 30% of one cross-sectional wedge shaped area.

Figure 12:
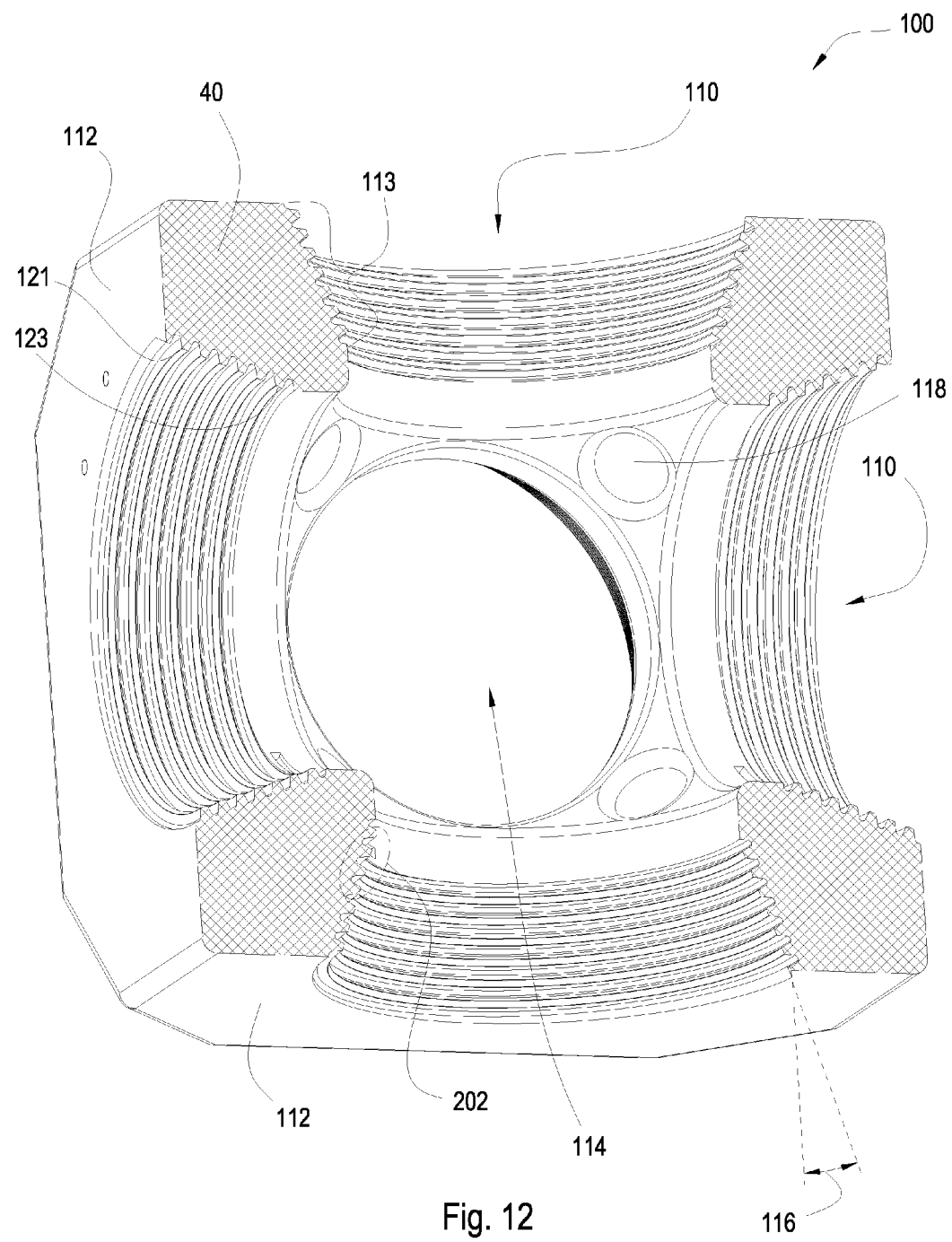
FIG. 12 is a cross-sectional diagram of an embodiment of a unitary frame.

This relationship between the two cross-sectional areas is more readily seen in FIG. 11, which is a detailed diagram of enlargement 200 in FIG. 10 including a cross-sectional wedge shaped area 40 and a cross-sectional conical area 42. The cross-sectional wedge shaped area 40 is circumscribed by a perimeter 220 comprising of the inner reaction chamber 114, the corresponding outer surface 112, and adjacent coaxial openings 110 including internal threadform 113 along the coaxial openings 110. The most preferred ratio between the cross-sectional conical area 40 and cross-sectional wedge shaped area 42 is about 42.2%. However, a range between about 30% and 70% may be beneficial The optimum ratio between the two cross-sectional areas for a particular application may be established such that the reaction forces of the press apparatus are distributed substantially equally across the threadforms. Unlike traditional threaded connections, especially those employing a taper, the threaded connection between the internal threadform 113 and external threadform 26 are non-shouldering i.e. the hydraulic cartridge 20 preferably does not shoulder against the unitary frame 100. However, the external and internal threadforms are timed such that each hydraulic cartridge stops substantially at the same point and have matched rotation when making up the connection between hydraulic cartridge and unitary frame. Thus, the hydraulic cartridges are interchangeable and can be easily transferred from one coaxial opening to another as occasion demands. Moreover, because of the taper, number of threads, and coarseness of the thread form, the hydraulic cartridges require only about three to three and a half complete turns for all the threads to fully engage. The threaded connection is hence a more efficient design such that assembly and repair of the press apparatus is significantly quicker than previous designs which required at least fifteen complete rotations for the threads to seat. Consequently, the threaded connection of the present invention is around five times quicker to assemble than previous designs. Additionally, thread damage due to accidental cross-threading during make up of the hydraulic cartridge and unitary frame is substantially reduced with the present invention FIG. 12 is a cross-sectional diagram of the unitary frame 100 including substantially coaxial openings 110, an inner reaction chamber 114, and an outer surface 112. The internal threadform 113 is adapted to mate with the hydraulic cartridge (not shown). Internal threadform 113 extend axially substantially between the inner chamber 114 and outer surface 112. The coaxial opening surface may include a pre-determined number of threads for engaging the hydraulic cartridge. However, in a preferred embodiment, the first thread 121 begins proximate the outer surface 112 while the last thread 123 does not quite extend all the way through the coaxial opening 110. The number of threads axially extending along the coaxial openings is preferably between five and nine, where six threads are most preferable in some embodiments. The coaxial openings comprise a taper 116 which is readily discernable from the drawing. In the preferred embodiment, the coaxially threaded opening taper is between the range of about 2.650 and 5.650 inches per foot and is most preferably about 4.368 inches per foot. The inner reaction chamber 114 is most preferably substantially spherical in shape.

Figure 13:
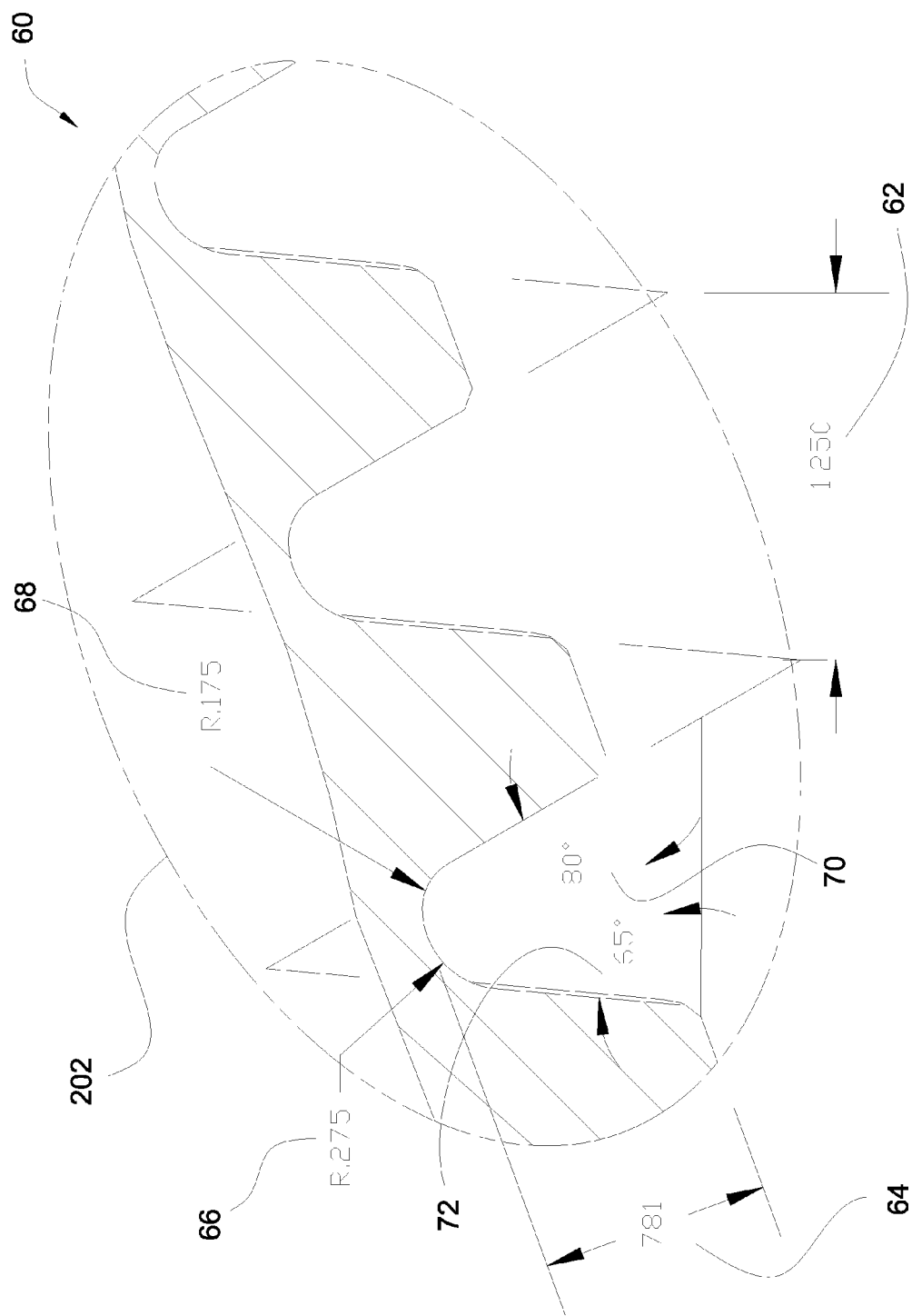
FIG. 13 is a detailed diagram of a thread form of a preferred embodiment.

FIG. 13 depicts the threadform of the preferred embodiment which is a detailed diagram of enlargement 202 in FIG. 12. Threads such as the threadform 60 may be preferable for both the internal and external threadforms. An embodiment of the threadform of the present invention is one with a thread pitch 62 of about 1.250 inches and a thread depth 64 of about 0.781 inches. Another distinguishing feature is the dual root radii 66 and 68 where a face radius 66 is about 0.275 inches and a back radius 68 is about 0.175 inches. The preferred flank angles of the thread are a back flank angle 70 of eighty degrees and a face flank angle 72 of sixty-five degrees. Increased thread coarseness further strengthens the threaded connection and with this unique threadform, may provide equal strain distribution across the threads. In a preferred embodiment, the threadforms of both internal and external threads of the coaxial openings and hydraulic cartridges respectively, mate with one another as depicted in FIG. 13.

Figure 14:
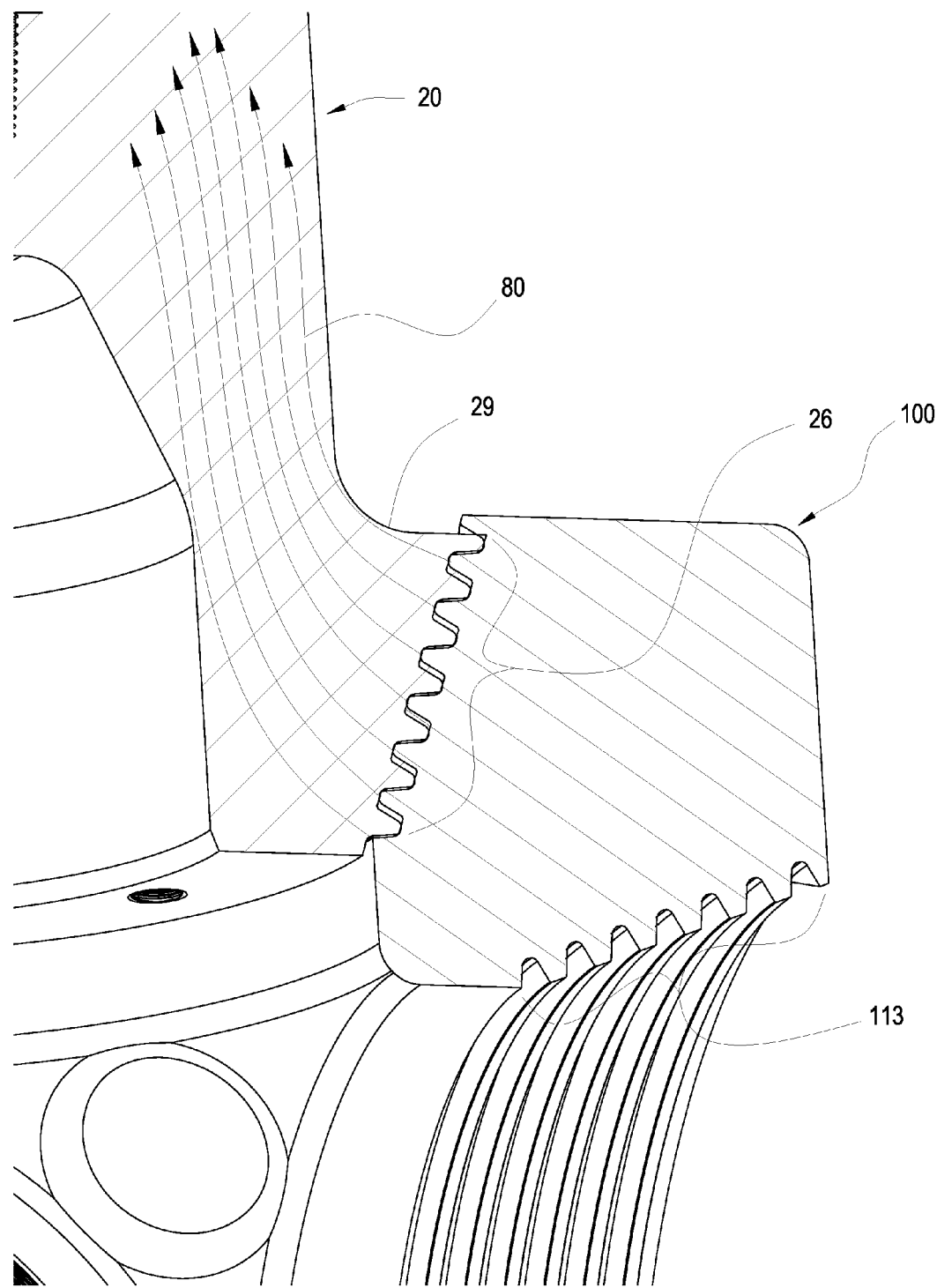
FIG. 14 is a cross-sectional diagram depicting an embodiment of strain force lines in strain matched threads.

FIG. 14 diagrammatically depicts strain force lines 80 in the strain matched threadforms 26, 113 of the present invention. It is believed that, three variables that may generally determine the ability of a threaded connection to withstand the forces applied to it during a press cycle, the radius cut, the degree of taper, and type of threadform. By proper balancing of these three variables, it is believed that the threaded connection is substantially strain matched such that each thread in the threadforms bear an equal amount of the reaction forces propagated through the connection during a high pressure high temperature press cycle. The strain force lines 80 illustrate how the reaction force is believed to evenly propagate through the threaded connection to the hydraulic cartridge 20. This enables the high pressure high temperature apparatus to withstand higher reaction forces. It is believed that his threaded connection design enables the press apparatus to have a tonnage rating of about 6600 tons while only weighing 25 tons. This represents a substantial increase in capabilities compared to previous press designs where a 3000-ton capacity press weighed 30 tons for a reduced mass unitary frame design or as high as 100 tons or more, for a conventional tie-bar frame press of the same tonnage capacity. By comparison, the threaded connection of the present invention enables a press apparatus to have half the mass for over twice the tonnage capacity. A larger payload can be placed in the inner reaction chamber significantly reducing the cost per part of superhard material produced. The payload may be as much as twice the previous amount available in earlier press apparatuses.

Figure 15:
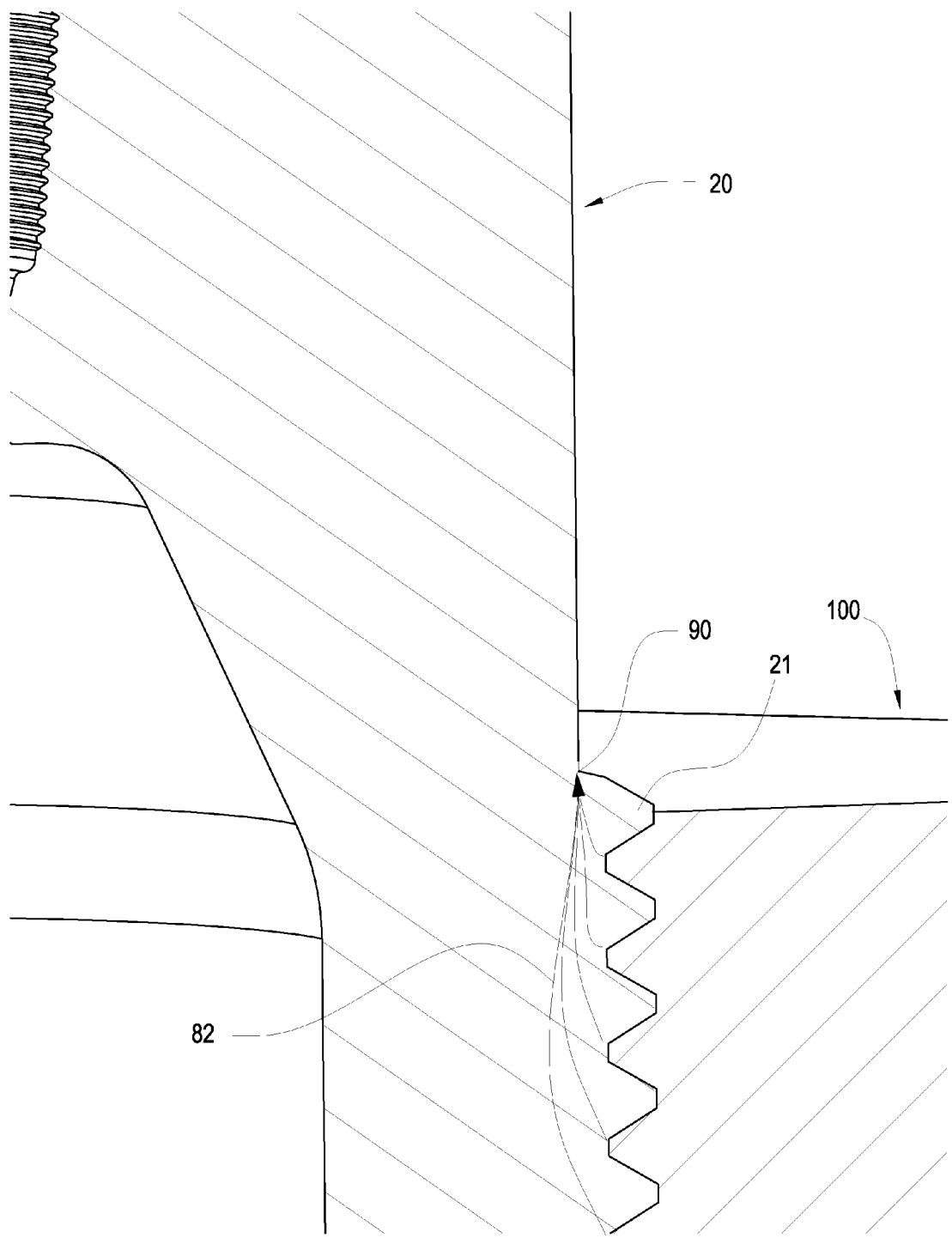
FIG. 15 is a cross-sectional diagram depicting strain force lines in a threaded connection.
Figure 16:
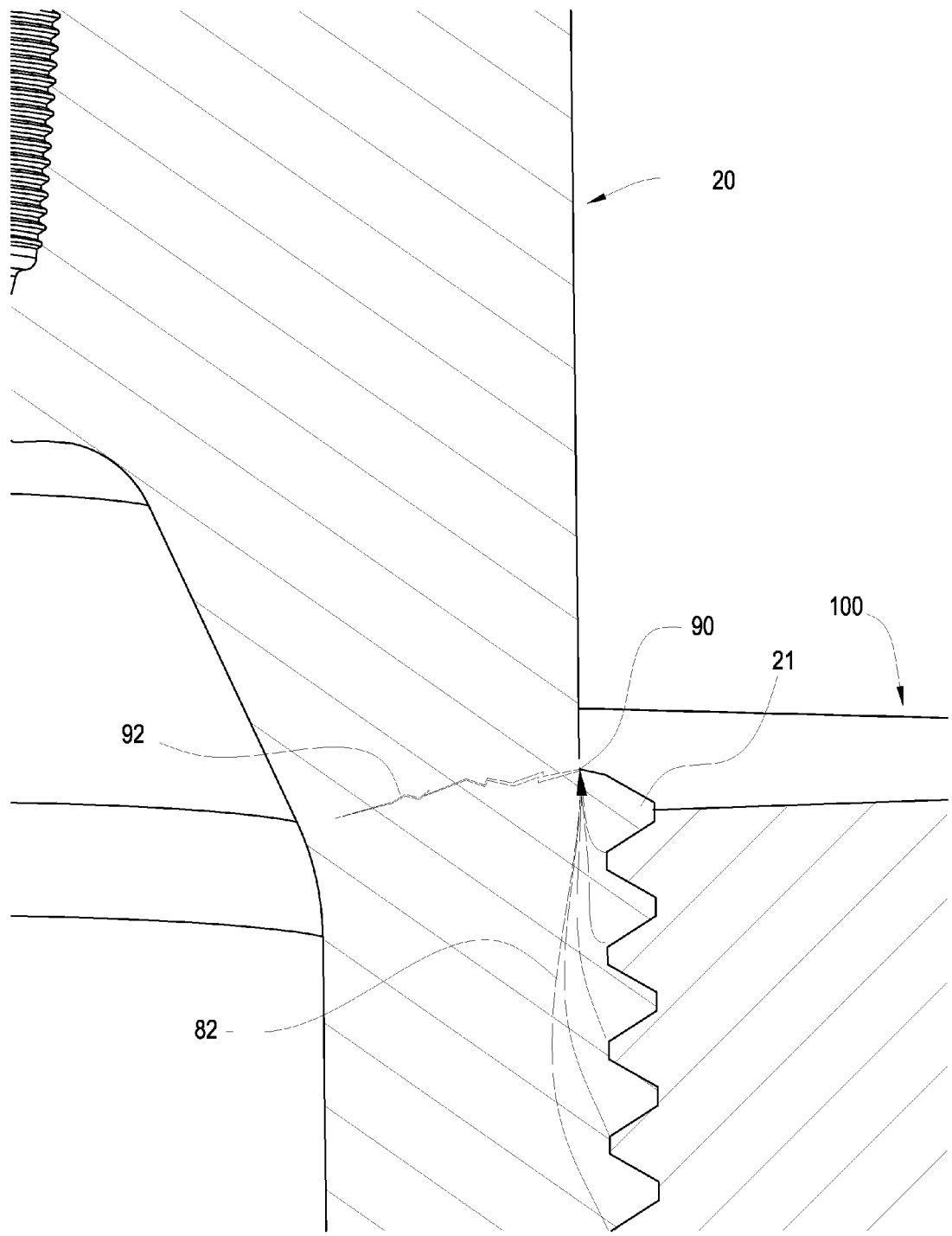
FIG. 16 is a cross-sectional diagram depicting a failure point and failure propagation site of a threaded connection.

FIG. 15 diagrammatically depicts strain force lines 82 in a threaded connection. Usually the first three threads of a threaded connection accept the brunt of the load applied to the connection As the strain propagates through the thread form the root 90 of the first thread 21 bears most of the load due to additive loading. FIG. 16 depicts the failure point and propagation of a threaded connection from repeated use of the press apparatus at the root 90. The fissure 92 represents the manner in which a failure mode may propagate from the root 90 of the first thread 21 through the hydraulic cartridge 20. It is believed that because the unitary frame 100 is stiffer and may withstand the reaction forces better, the hydraulic cartridges bear most of the pressure load and may sometimes fail resulting in lost production and causing damage to the frame as well.

Figure 17:
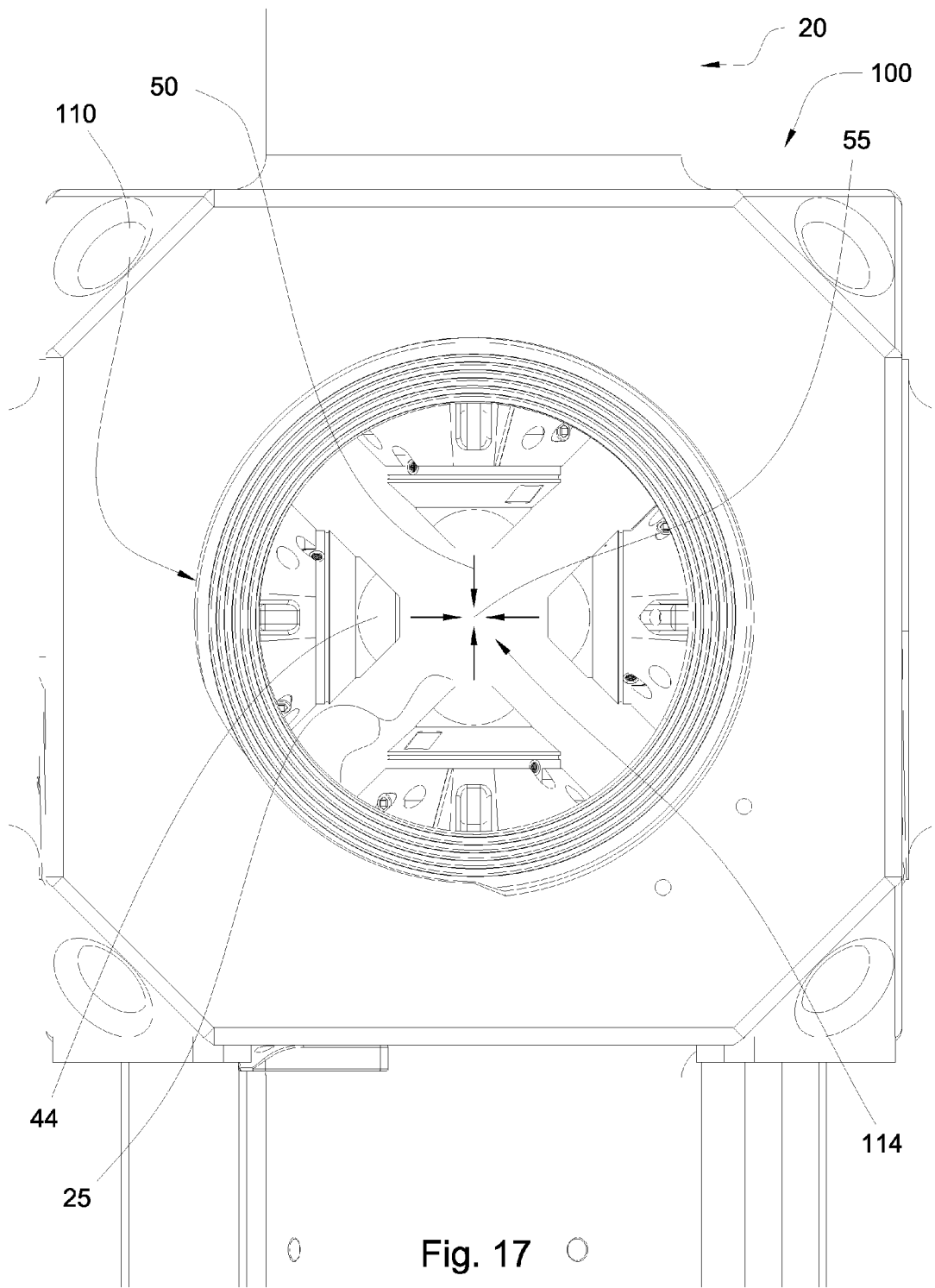
FIG. 17 is a perspective diagram of an embodiment of an internal reaction chamber of the unitary frame including the working ends of the hydraulic cartridges.

FIG. 17 shows the internal reaction chamber 114 of the unitary frame 100 as seen through a coaxial opening 110 including the working ends 25 of the hydraulic cartridges 20. When the threadforms are timed, the working ends 25 of the hydraulic cartridges 20 may be screwed into the frame substantially equidistant 50 from the center point 55 of the internal reaction chamber 114. This feature enables the anvils 44 to extend in a uniform manner as they then engage the reaction cell (not shown) to increase its internal pressure during superhard material synthesis.

Figure 18:
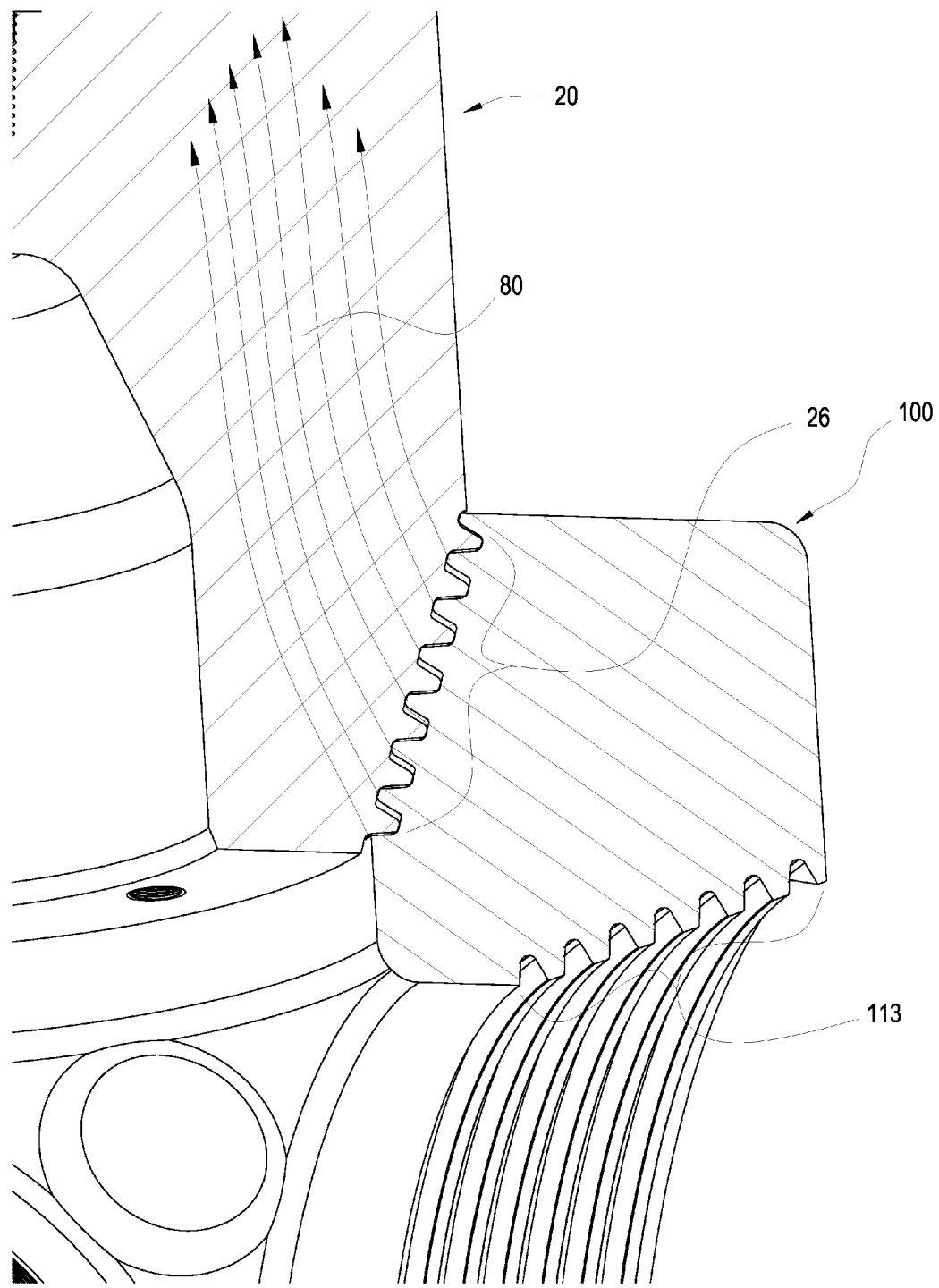
FIG. 18 is a cross sectional diagram depicting another embodiment of strain force lines in strain matched threads.

FIG. 18 shows another embodiment of the threaded connection showing the external threads without a radius undercut.

This invention could be applied to other HPHT press designs. For example, the threadform and thread features including the taper and radius cut could be used in a tie-bar press design. The threaded connections on the end of a tie-bar and piston bases could be formed like the threads on the hydraulic cartridges and the coaxial openings of the unitary frame of the present invention. This would likely substantially increase the tonnage capacity of a tie-bar frame style HPHT press apparatus.

In some embodiments of the present invention, the plurality of threads in either the internal or external threadforms may be substantially proportionally loaded, such that each adjacent thread is slightly incrementally loaded. In this embodiment, the first thread may not experience the same load as an adjacent thread but the load difference between the treads is not huge and does not overly load the one of the threads.

Whereas the present invention has been described in particular relation to the drawings attached hereto, it should be understood that other and further modifications apart from those shown or suggested herein, may be made within the scope and spirit of the present invention.

What is claimed is:

1. A hydraulic cartridge and unitary frame connection for a high pressure high temperature press apparatus, comprising:

the hydraulic cartridge comprising a cylindrical base and truncated hollow conical section with an external threadform comprising a plurality of threads and having a taper;

the unitary frame comprising an opening having an internal threadform comprising another plurality of threads and extending axially substantially between an outer surface and an inner reaction chamber defined by the unitary frame, the internal threadform being threadedly mated with the external threadform of the hydraulic cartridge and each thread is substantially equally loaded across the respective threadforms, wherein the hydraulic cartridge comprises a radius cut between the truncated conical section and cylindrical base.

2. The connection of claim 1 wherein the unitary frame has three pairs of substantially coaxial openings.

3. The connection of claim 2 wherein six hydraulic cartridges are attached to each coaxial opening along the length of the threads.

4. The connection of claim 2 wherein the unitary frame defines a cross-sectional wedge shaped area along a center plane orthogonal to a pair of coaxial openings, the wedge shaped cross-sectional area circumscribed by a perimeter comprising the inner reaction chamber, the corresponding outer surface, and adjacent coaxial openings including the internal threadforms along the coaxial openings;

the truncated conical section defining a cross-sectional conical area between an inside diameter of the truncated hollow conical section and the external threadforms with a taper;

wherein the cross-sectional threaded area is at least about 30% of the cross-sectional wedge shaped area.

5. The connection of claim 4 wherein the cross-sectional conical area is between no greater than 70% of the cross-sectional wedge area.

6. The connection of claim 4 wherein the cross-sectional area of each cartridge is about 42.2% of the frame cross-sectional wedge area.

7. The connection of claim 1 wherein the taper is between about 2.650 and 5.650 inches per foot.

8. The connection of claim 1 wherein the radius cut is between the range of about 1.000 and about 5.500 inches.

9. The connection of claim 1 wherein the radius cut is about 2.000 inches.

10. The connection of claim 1 wherein the internal threadform further comprise between 5 and 9 threads.

11. The connection of claim 1 wherein the opening internal threadform further comprise 6 threads.

12. The connection of claim 1 wherein the opening internal threadform further comprises a thread pitch of about 1.250 inches, a thread depth of about 0.781 inches, a back flank angle of 80°, a face flank angle of 65°, a back root radius of about 0.175 inches, and a face root radius of about 0.275 inches.

13. The connection of claim 1 wherein the taper is about 4.368 inches per foot.

14. The connection of claim 1 wherein the opening comprises a taper that is between the range of about 2.650 and 5.650 inches per foot extending radially inward from a first opening thread of the internal threadform adjacent the outer surface to a last opening thread of the internal threadform adjacent the inner chamber.

15. The connection of claim 14 wherein the opening comprises a taper that is about 4.368 inches per foot.

16. The connection of claim 1 wherein the unitary frame and hydraulic cartridge are non-shouldering.

17. The connection of claim 1 wherein the external threadform further comprise between 5 and 9 threads.

18. The connection of claim 1 wherein the external threadform further comprise 6 threads.

19. The connection of claim 1 wherein the external threadform further comprises a thread pitch of about 1.250 inches, a thread depth of about 0.781 inches, a back flank angle of 80°, a face flank angle of 65°, a back root radius of about 0.175 inches, and a face root radius of about 0.275 inches.

20. The hydraulic cartridge and unitary frame connection of claim 1 wherein the opening internal threadform and hydraulic cartridge external threads are timed such that a working end of each cartridge is substantially equidistant from a center point of the inner chamber.

\* \* \* \* \*